(No Model.)

F. A. NORCROSS.
Carriage Top.

No. 235,892. Patented Dec. 28, 1880.

Witness:
E. W. Baird
J. H. Roosa

Inventor:
Franklin A. Norcross
By Geo. W. Tibbitts

UNITED STATES PATENT OFFICE.

FRANKLIN A. NORCROSS, OF CLEVELAND, OHIO.

CARRIAGE-TOP.

SPECIFICATION forming part of Letters Patent No. 235,892, dated December 28, 1880.

Application filed September 27, 1880. (No model.)

*To all whom it may concern:*

Be it known that I, FRANKLIN A. NORCROSS, of Cleveland, county of Cuyahoga, and State of Ohio, have invented a certain new and useful Carriage-Top Brake, which is fully set forth in the following specification.

Figure 2:
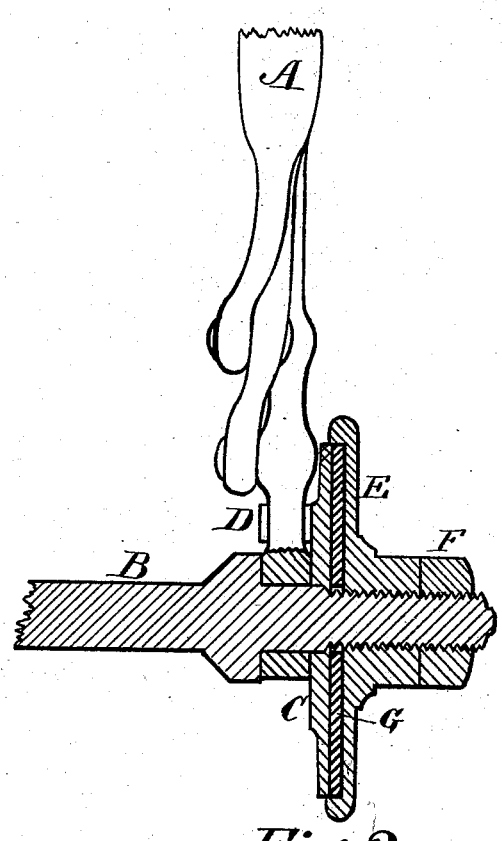
Figure 1:
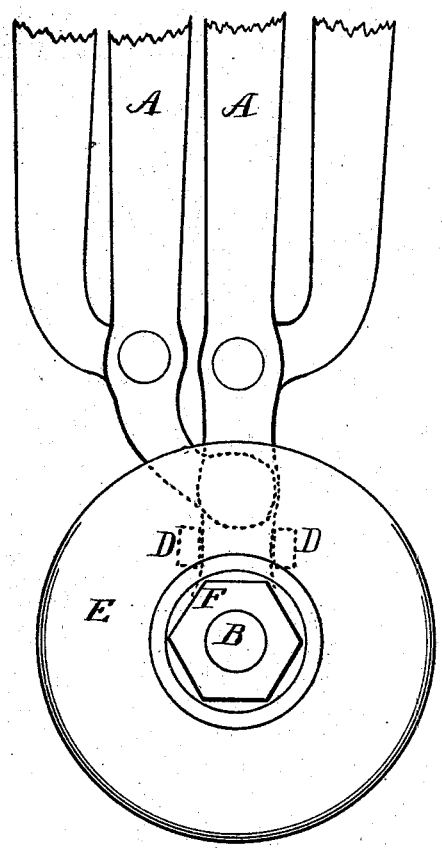

In the accompanying drawings, Figure 1 is a front or face view of my brake device as seen attached to the foot of the bows of a carriage-top. Fig. 2 is a transverse section of the same.

The nature and objects of this invention will fully appear from the subjoined description, when considered in connection with the accompanying drawings.

A represents the sockets for the bows of a carriage or buggy top, one of which is pivoted to the seat-iron B. C is a circular plate placed onto the said seat-iron B next to and outside of the bow-iron A, and has two lugs, D D, projecting from the inside face, and which extend back and embrace the said bow-iron, by means of which the said plate C is made to turn with the said bow-iron. E is a second circular plate, provided with an annular flange at its periphery and a collar at its center, in which is cut a screw-thread for screwing said plate onto the iron B. Between said plates C and E is interposed a washer or packing, G, of leather or other suitable material. Outside of the collar, on the iron B, is placed a jam-nut, F.

By screwing the plate E with force against the packing G a degree of friction may be obtained which is employed as a brake force to prevent the carriage-top from falling back violently whenever the top is thrown back and endangering the breakage of the bow, the object of the device being to break the force of the fall and obviate the liability to breakage.

The form of the plates C and E may be varied from that shown as taste may dictate. They may be conical or convex in form, and serve the same purpose.

The device may be applied to the prop-iron at the back corner of the seat, if desired, with like effect. This device is also adapted to prevent the rattling of the irons at the joint where the bows are attached to the seat.

Having described my invention, I claim—

The combination, with the carriage-bow-iron A and seat-iron B, of the plate C, provided with lugs D D, the plate E, having a collar and jam-nut, F, and the washer or packing G, interposed between said plates C E, for the purpose of supplying a brake for carriage-tops, substantially as described.

F. A. NORCROSS.

Witnesses:
E. W. LAIRD,
GEO. W. TIBBITTS.